A. NICHOLS,

Assignor to himself and C. GRANT, Jr.

Shoes.

No. 9,618. Reissued March 22, 1881.

Witnesses.

Robert Ewett.

Edward G. Siggers

Inventor.

Andrew Nichols by W. H. Babcock

Atty.

NORRIS PETERS INC., LITHO., WASHINGTON, D. C.

UNITED STATES PATENT OFFICE.

ANDREW NICHOLS, OF BOSTON, MASSACHUSETTS, ASSIGNOR TO HIMSELF AND CHARLES GRANT, JR., OF SAME PLACE.

SHOE.

SPECIFICATION forming part of Reissued Letters Patent No. 9,618, dated March 22, 1881.

Original No. 230,649, dated August 3, 1880. Application for reissue filed February 15, 1881.

*To all whom it may concern:*

Be it known that I, ANDREW NICHOLS, of Boston, in the county of Suffolk and State of Massachusetts, have invented certain new and useful Improvements in Spring-Heels for Soles; and I do hereby declare that the following is a full, clear, and exact description of the invention, that will enable others skilled in the art to which it appertains to make and use the same, reference being had to the accompanying drawings, and to the letters of reference marked thereon, which form a part of this specification.

This invention relates to "spring-heel" soles; and it consists in the construction and combination of parts hereinafter set forth and claimed.

Figure 1:
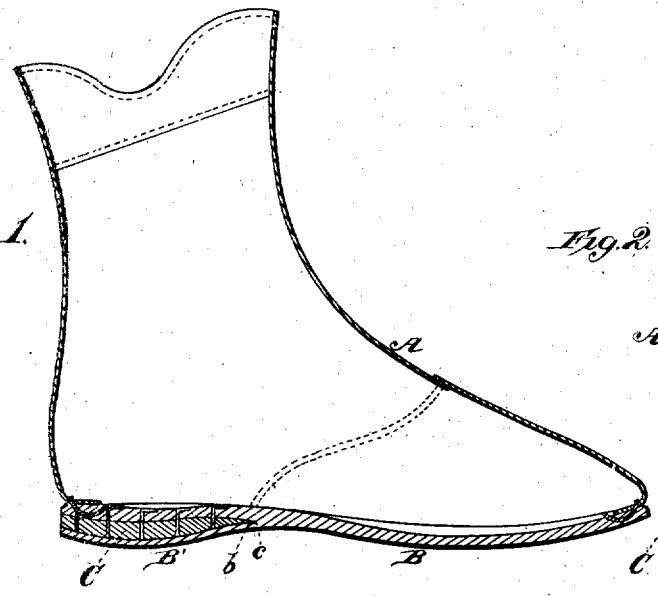
Figure 2:
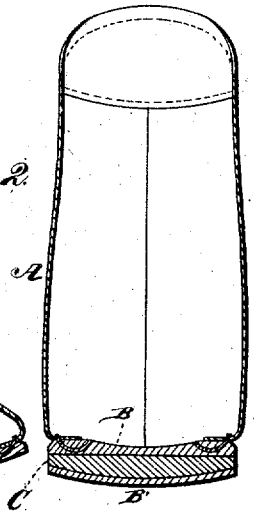
Figure 3:
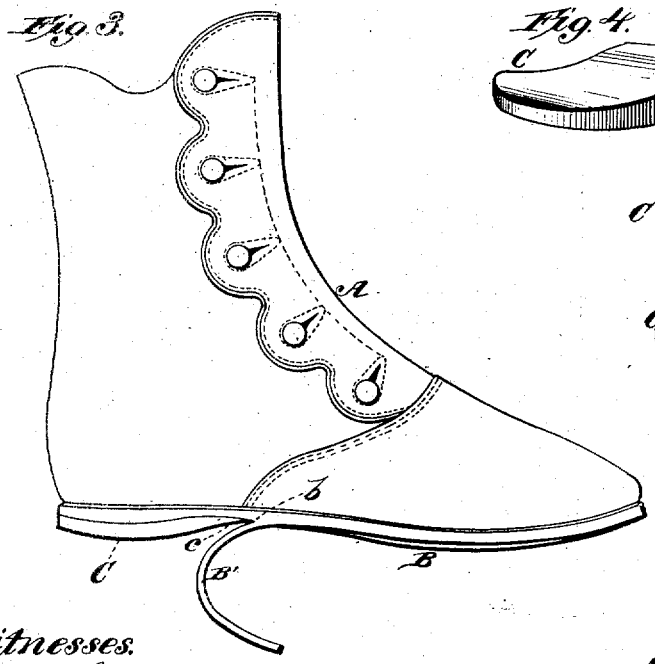
Figure 4:
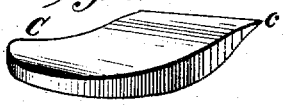
Figure 5:
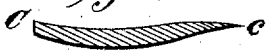
Figure 6:
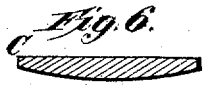

In the accompanying drawings, Figure 1 represents a longitudinal vertical section of a shoe embodying my invention; Fig. 2, a transverse vertical section of the same taken through the heel; Fig. 3, a side elevation of the same just before closing the rear flap on the re-enforce; Fig. 4, a perspective view of the re-enforce detached; Fig. 5, a longitudinal vertical section through the middle of said re-enforce alone, and Fig. 6 a transverse vertical section through the middle of the same.

A designates the upper of a shoe, and B the sole thereof. Said parts A and B are fastened together, as usual.

To give the heel the required convexity on its bottom, I make use of a re-enforce, C, which has a convex lower face, and which I apply as follows: I slit the sole through the said heel portion from its rear edge toward the sole-shank, the slit being horizontal, or approximately so, as shown in Fig. 3, thus partly severing a lower flap, B′, from the main part of the sole and heel. I attach the said re-enforce, by nails, pegs, or any other suitable means, to the main part of said heel portion, which it fits and covers. I then turn the flap B′ over the convex lower face of said re-enforce, and cement or otherwise fasten it thereto. As said flap necessarily conforms to the convex shape of the re-enforce, a spring-heel is produced having the required convexity of bottom.

The re-enforce C may be of any suitable material, though sole-leather is ordinarily preferred. Its front edge, *c*, is beveled off, so as to fit snugly into the beveled front end, *b*, of the cleft aforesaid; and the remainder of its periphery conforms to the adjacent parts of the sole, being vertical, or nearly so, and suitably curved, so that the sides and rear of the heel will be smooth and symmetrical.

Prior to this invention it has been considered difficult, if not impossible, to form the sole of a "turned" shoe with a "spring-heel." My invention easily effects this purpose. In so doing, I first sew the upper and sole together, while the upper is turned inside out. I then reverse the upper, so that it will be in position for use. I then slit the heel portion of the sole and insert and fasten the re-enforce, as hereinbefore described, and finally fasten the outer flap. The drawings show the stitching for uniting the turned edges of the upper with the sole by passing only part of the way through the sole, and then out again on the upper side thereof.

Having thus described my invention, what I claim as new, and desire to secure by Letters Patent, is—

1. A sole having a convex re-enforce fastened within a slit in its heel portion, so as to give to the bottom of said heel a convex shape, substantially as and for the purpose set forth.

2. In combination with sole B, having heel-flap B′, a re-enforce, C, having its front edge beveled at *c* and its lower face convex, as shown, said re-enforce being secured to the main part of said sole, and said flap being secured to said re-enforce, substantially as and for the purpose set forth.

3. As an improved manufacture, a shoe having its sole split at the heel portion and a re-enforce inserted and secured therein, substantially as set forth.

4. The method of making a shoe, consisting of fastening the upper and sole together, substantially as described, then slitting the sole from its heel to, or nearly to, its shank, between the stitching and the outer face of the sole, and inserting in the slit and fastening to the inner faces thereof a convex re-enforce, substantially as set forth.

In testimony that I claim the foregoing I have hereunto set my hand this 8th day of February, 1881.

ANDREW NICHOLS.

Witnesses:

H. E. LODGE,

F. G. SIMPSON.